Oct. 18, 1938.　　D. H. BENNETT　　2,133,277
CUTTER OR SICKLE BAR
Filed Nov. 9, 1936
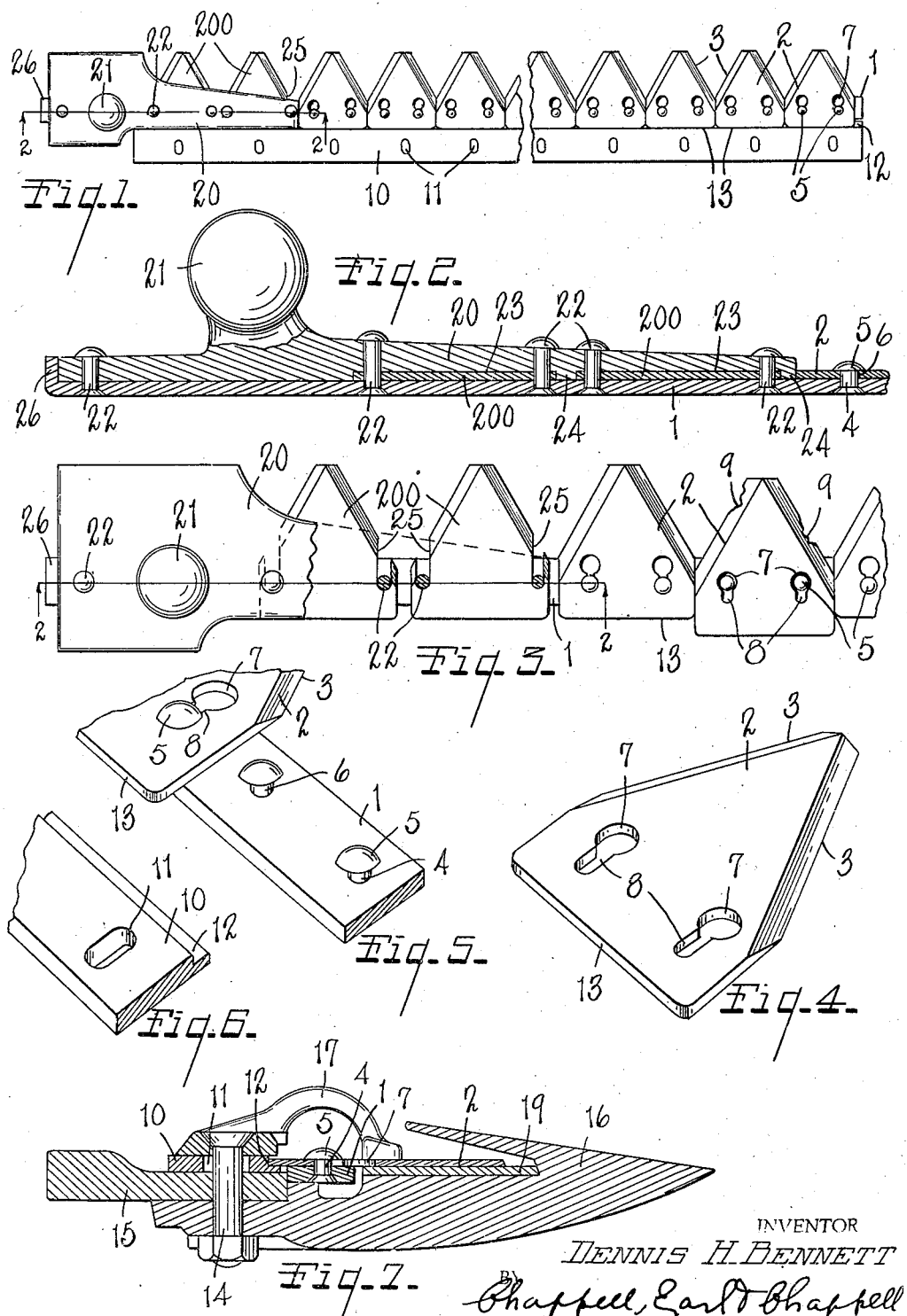

Patented Oct. 18, 1938

2,133,277

UNITED STATES PATENT OFFICE 2,133,277

CUTTER OR SICKLE BAR

Dennis H. Bennett, Grandville, Mich., assignor of one-third to Lillian Halford and one-third to Walter E. Ihling, both of Kalamazoo, Mich.

Application November 9, 1936, Serial No. 109,940

14 Claims. (Cl. 56—298)

The main objects of my invention are:

First, to provide an improved cutter or sickle bar adapted for employment with a reciprocating mechanism of the type commonly used in harvesting machines, mowing machines, and the like.

Second, to provide a sickle or cutter bar of the type described in which the individual cutter blades may be quickly and easily removed and replaced and which are at the same time very securely held in assembled relation to the bar proper.

Third, to provide a device of the type described having cutter blades which are readily attached and detached with a common means for securing all the blades in operative relation when the machine is in use.

Further objects relating to details and economies of my invention will definitely appear from the description to follow. The invention is defined in the claims.

A preferred embodiment of my invention is illustrated in the accompanying drawing, in which:

Fig. 1 is a fragmentary top plan view of my improved cutter bar, the retaining bar being shown in operative relation thereto.

Fig. 2 is an enlarged fragmentary view mainly in longitudinal section on line 2—2 of Figs. 1 and 3.

Fig. 3 is an enlarged fragmentary view illustrating one of the steps in removing or placing a blade.

Fig. 4 is a perspective view of one of the cutter blades.

Fig. 5 is an enlarged fragmentary perspective view further illustrating the cutter bar structure and blades and method of attaching the blades.

Fig. 6 is a fragmentary perspective view of the retaining bar which is common to all of the blades.

Fig. 7 is an enlarged transverse section illustrating the cutter bar in operative relation to the carrying bar or support.

Referring to the drawing, the numeral 1 indicates the cutter bar proper on which is mounted a plurality of individual cutter blades 2 having A-shaped or angularly disposed forwardly converging cutting edges 3. The blades are mounted upon the bar 1 to facilitate their ready placement and removal, and to accomplish this I provide a plurality of headed studs or rivets 4 which are secured in the bar at spaced intervals and in pairs to coact with each blade. The studs are countersunk in the lower side of the bar so as to provide a smooth surface for slidable coaction with the support. The studs have heads 5 spaced from the upper side of the bar to provide exposed shanks 6 with which the cutter blades may be engaged.

The cutter blades are formed with a plurality of keyhole-shaped openings adapted to receive the studs, each opening comprising a hole 7 of sufficient diameter to pass over the head 5 of a stud and a narrower slot portion 8 communicating with the hole 7 and of a size to snugly engage and slidably receive the shanks 6 of the studs. These keyhole openings are disposed with their narrower portions toward the rear of the cutter blades. To attach the blade, it is only necessary to pass the heads through the enlargements of the slots and push the blades forwardly. The detachment is a reverse operation. At 9, I indicate a blade that has been broken or damaged. Where blades are attached by riveting, as is the general practice, considerable time is required in the replacement of a blade and in many uses, particularly in mowing machines, blades are frequently broken by stones or sticks or other objects coming between the blade and its guard or coacting shear plate.

The cutters may be sharpened individually, or a set of blades provided for use while the entire set of blades are being sharpened.

The blades are all held in proper position on the cutter bar by means of the retaining bar 10 disposed at the rear of the cutter bar and having transverse slots 11 receiving the bolts 14 by which it is adjustably clamped to the main beam or carrier bar 15. The retaining bar 10 is provided with a rabbeted edge 12 in which the rear edges 13 of the cutter blades travel and abut as clearly shown in Fig. 7. The usual guards 16 are provided and also the hold-on clips 17. Shear plates 19 are mounted on the guards 16, these coacting with the cutter blades as will be readily understood.

The cutter bar is provided with a coupling head 21 of the ball joint type adapted for connection to the connecting rod or pitman for reciprocating the cutter bar. This coupling head is provided with an attaching plate 20 secured to the bar 1 by means of the rivets 22. The bar is preferably provided with an upturned end 26 forming an abutment for the attaching plate and receiving a part of the stress incident to the reciprocation of the bar. The coupling head plate 20 is recessed at 23, abutments 24 being left between the recesses to contact with the cutter bar, the recesses providing openings between the plate and bar for reception of the blades 200 which are inserted and removed from the rear of the bar. These blades have slots or recesses 25 in their side edges adapted to receive the shanks of the rivets 22 to position and support the blades, the ends of the slots or recesses forming shoulders engaging the rivets. The bar 10 serves to retain these blades 200.

From the above description, it will be apparent that I have devised a sickle or cutter bar of the type described, which provides a very convenient means for mounting the blades permitting their ready removal and replacement. The blades are all securely retained in operative relation. The structure is simple and economical in its parts and the blades can be removed and replaced in the field without tools other than a wrench.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a reciprocating cutter, the combination of a cutter bar having a plurality of headed studs arranged thereon in spaced pairs with the heads of the studs spaced from the bar, a plurality of cutter blades having forwardly converging cutting edges and provided with keyhole slots disposed with their reduced portions rearwardly and receiving pairs of said studs, said studs supporting said cutter blades in edge-to-edge relation on the cutter bar with their rear edges projecting rearwardly of the cutter bar, a retaining bar having a rabbeted edge receiving the rear edges of said blades and acting to restrain displacement thereof, said retaining bar having provision for adjustment transversely of said cutter bar.

2. In a reciprocating cutter, the combination of a cutter bar having a plurality of headed studs arranged thereon in spaced pairs with the heads of the studs spaced from the bar, a plurality of cutter blades having forwardly converging cutting edges and provided with holes slidably engaging said studs, said studs supporting said cutter blades in edge-to-edge relation on the cutter bar with their rear edges projecting rearwardly of the cutter bar, a retaining bar having a rabbeted edge receiving the rear edges of said blades and acting to restrain displacement thereof, said retaining bar having provision for adjustment transversely of said cutter bar.

3. In a reciprocating cutter, the combination of a cutter bar having a plurality of headed studs arranged thereon in spaced pairs with the heads of the studs spaced from the bar, and a plurality of cutter blades having forwardly converging cutting edges and provided with elongated rectilinear keyhole slots disposed with their reduced portions rearwardly and receiving pairs of said studs, said studs supporting said cutter blades in edge-to-edge relation on the cutter bar.

4. In a reciprocating cutter, the combination of a cutter bar having a plurality of headed studs arranged therealong with the heads of the studs spaced from the bar, and, a plurality of cutter blades provided with keyhole slots having reduced portions disposed rearwardly and receiving said studs.

5. In a reciprocating cutter, an elongated cutter bar having a plurality of headed studs arranged therealong in spaced relation with the heads of the studs spaced from the bar, a plurality of cutter blades, said blades being provided with enlarged holes to receive the heads of said studs and slots communicating with said holes in which the shanks of the studs are received in assembled position, and means operatively associated with said bar and blades to restrain displacement thereof.

6. In a reciprocating cutter, the combination of a cutter bar, a coupling head provided with an attaching plate disposed on said bar, attaching rivets arranged through said bar and plate, said plate being undercut on its under side to provide blade receiving recesses, certain of said rivets being disposed to extend through said recesses, cutter blades slidable in said recesses and having forwardly facing notches in their edges engaging said rivets, and an adjustable retaining bar coacting with the rear edges of said blades and adjustable transversely of the cutter bar.

7. In a reciprocating cutter, the combination of a cutter bar, a coupling head provided with an attaching plate disposed on said bar, attaching rivets arranged through said bar and plate, said plate being undercut on its under side to provide blade receiving recesses, certain of said rivets being disposed to extend through said recesses, cutter blades slidable in said recesses and having forwardly facing notches in their edges engaging said rivets, and retaining means coacting with the rear edges of said blades.

8. In a reciprocating cutter, the combination of a cutter bar, a coupling head provided with an attaching plate disposed on said bar, the adjacent end of the bar being turned upwardly to form an abutment for said plate, attaching rivets arranged through said bar and plate, said plate being undercut on its under side to provide blade receiving recesses, certain of said rivets being disposed to extend through said recesses, cutter blades slidable in said recesses and having forwardly facing notches in their edges engaging said rivets, and retaining means coacting with the rear edges of said blades.

9. In a reciprocating cutter, the combination of a cutter bar, a coupling head provided with an attaching plate disposed on said bar, the end of the bar being turned upwardly to form an abutment for said plate, attaching rivets arranged through said bar and plate, said plate having portions spaced from said bar to provide blade receiving recesses, certain of said rivets being disposed to extend through said recesses, cutter blade slidable in said recesses and having forwardly facing shoulders engaging said rivets, and an adjustable means coacting with the rear edges of said blades.

10. In a reciprocating cutter, a cutter bar, a coupling head provided with an attaching plate joined to said bar by spaced rivets and a blade mounted between said plate and bar, said plate and bar having a blade receiving recess therebetween, said blade having angled sharpened faces, and slots formed in said blade adapted to engage said rivets, whereby said blade may be slid into operative position and accurately registered between said plate and bar.

11. In combination, a cutter bar, a plurality of cutter blades carried thereby, means for securing said blades to said bar, comprising a plurality of rivets extending through said bar with the heads thereof spaced from the bar, certain of said blades having holes therein adapted to pass over said heads and restricted portions to engage the shanks of the rivets, means for reciprocating said bar, comprising a plate having an actuating extension, said plate providing openings between the plate and bar through which the other blades may be inserted, further rivets securing said bar and plate together and extending through said opening, said other blades having forwardly opening slots adapted to engage said last named rivets, and means for restraining all of said blades from displacement.

12. In combination, a cutter bar, a plurality of cutter blades carried thereby, means for securing said blades to said bar, comprising a plurality of studs extending above said bar, certain of said blades having holes therein adapted to engage the studs, means for reciprocating said bar, comprising a plate having an actuating extension, said plate providing openings between the plate and bar through which the other blades may be inserted, and means for restraining all of said blades from displacement.

13. In a reciprocating cutter, a cutter bar, means for reciprocating said bar, comprising a plate joined to said bar by spaced rivets, and a plurality of blades mounted between said plate and bar, said plate being recessed to form receiving openings for said blades between said plate and bar, said blades having angled sharpened faces and slots formed in said faces adapted to engage said rivets, whereby said blades may be slid into operative position and accurately registered in said openings.

14. In a reciprocating cutter, a cutter bar, means for reciprocating said bar, comprising a plate joined to said bar by spaced rivets, and a blade mounted between said plate and bar, said plate being recessed to form a receiving opening for said blade between said plate and bar, said blade having slots formed therein adapted to engage said rivets, whereby said blade may be slid into operative position and accurately registered in said opening.

DENNIS H. BENNETT.